3,192,165
MINERAL OIL COMPOSITION
Joseph E. Fields and Edward H. Mottus, St. Louis, Mo., assignors to Monsanto Company, a corporation of Delaware
No Drawing. Original application Dec. 30, 1960, Ser. No. 79,500. Divided and this application Dec. 31, 1962, Ser. No. 248,263
9 Claims. (Cl. 252—56)

The invention relates to new polymeric materials especially useful as dispersant additives and viscosity index improvers and some of which are also useful as pour point depressants. Particularly desirable are the methacrylatevinyloxyethanol polymers having relative syndiotacticity of at least 70, preferably at least 87. These highly syndiotactic polymers of the invention are also described in copending application Serial No. 79,671, filed December 30, 1960. This invention also relates to functional fluids including mineral and synthetic lubricating oil, diesel oil, hydraulic oil, automatic transmission oil and furnace oil compositions and the like containing the polymeric additives of the invention. This application is a division of copending application Serial No. 79,500, filed December 30, 1960, now abandoned.

There are a limited number of known ashless dispersant additives useful in oils. A new type of dispersant has now been discovered which has excellent dispersant properties, is a good viscosity index improver and can be made to be a pour point depressant. Broadly the invention involves interpolymers of vinyloxyethanol with alkyl methacrylates, alkyl acrylates, fumarates, maleates, vinyl esters or long chain-olefins to form oil-soluble additives. These interpolymers should contain from about 2 to about 20 weight percent, preferably about 5 to about 15 weight percent vinyloxyethanol.

It is an object of this invention to provide new polymers especially useful as dispersant additives.

It is another object of this invention to provide new polymers useful as viscosity index improvers as well as dispersant additives.

It is another object of this invention to provide new polymers useful as dispersants, viscosity index improvers and pour point depressants.

It is another object of this invention to provide new and useful dispersant additives which have very good hydrolysis stability.

It is another object of this invention to provide new dispersant additives which have the desirable properties of providing increased specific viscosity characteristics in the presence of barium high temperature detergents.

It is another object of this invention to provide new and improved functional fluid compositions.

These and other objects of the invention will become apparent as the detailed description of the invention proceeds.

The preferred polymer additives of the invention are the vinyloxyethanol-alkyl methacrylate polymers containing a minor amount of vinyloxyethanol and a major amount of alkyl methacrylate. These polymers are especially desirable for their good hydrolysis stability as well as their high potency as dispersant additives. A major amount means in excess of 50% by weight and a minor amount means less than 50% by weight, and obviously when two minor amounts are specified along with a major amount the two minor amounts must add up to less than 50% by weight.

The polymers of the invention having a relative syndiotacticity of greater than 70 are preferred because the greater the syndiotacticity the greater the viscosity index improving efficiency of the polymers; more preferable are polymers having relative syndiotacticity in excess of 87. Relative syndiotacticity is described in detail especially with respect to FIGURE 3 of copending application Serial No. 79,671, filed December 30, 1960. Methacrylate-vinyloxyethanol polymers made under free-radical catalysis at temperatures of the order of about 70° C. to about 100° C. have relative syndiotacticity greater than about 70 and less than 85; whereas, the same polymers made at temperatures of less than about 30° C., preferably less than 10° C. have relative syndiotacticity in excess of 87.

If the alcohol used to form the alkyl methacrylate monomers from methacrylic acid is a mixture of straight-chain alcohols such as the "Lorol" alcohols, then the polymers are also good pour point depressants. As dispersant additives these methacrylate-vinyloxyethanol polymers of the invention are useful as additives to oils such as automatic transmission oils, lubricating oils, diesel oils, furnace oils, hydraulic oils and the like. The oils can either be mineral or synthetic oils. Normally these polymers as dispersant additives will be incorporated in oil in amounts of from about 0.5 to about 15% based on the oil and polymer, preferably from about 1 to about 10%; except that if made up in concentrate form for blending back, they may be incorporated in amounts of about 15 to about 60%, preferably from about 20 to about 50%. These additives must be oil soluble preferably to the extent of at least about 1% in oil. The solubility will, of course, vary depending on the particular oil used. Oil solubility can be regulated to a certain extent by limiting the molecular weight of the polymer, specific viscosity measurements being indicative of molecular weight. Specific viscosity, 1% in benzene at 25° C., should be between 0.4 and 7.0, preferably between 0.6 and 3.0. Solubility in oil can also be regulated by the number of carbon atoms in the alkyl groups of the methacrylates which should be at least 6 carbon atoms, and preferably average at least 7.5 where the oil is a mineral lubricating oil. Single alkyl methacrylates can be used in making the polymers such as those having from about $C_6$ to about $C_{20}$ alkyl groups or mixtures of methacrylate monomers such as $C_8$–$C_{20}$ plus $C_1$–$C_4$ alkyl methacrylate. If a mixture of short and long chain alkyl methacrylate monomers are used with vinyloxyethanol to form polymers of the invention, the long chain alkyl methacrylate are preferably present in weight percent excess over the short chain alkyl methacrylate but in any event the amount of short chain alkyl methacrylate is restricted to insure oil solubility of the polymer. For the purposes of the invention oil-solubility is defined as the polymer being soluble at 25° C. to the extent of at least 1% in a petroleum base hydraulic fluid meeting Government specifications MIL-0-5606.

The following is a non-limiting and illustrative listing of alkyl methacrylate monomers from which can be chosen single monomers or combinations of monomers for use in making the polymers of the invention. Methyl methacrylate, ethyl methacrylate, n-propyl methacrylate, isopropyl methacrylate, n-butyl methacrylate, isobutyl methacrylate, t-butyl methacrylate, n-amyl methacrylate, n-hexyl methacrylate, n-heptyl methacrylate, n-octyl methacrylate, isooctyl methacrylate, n-decyl methacrylate, n-dodecyl methacrylate, t-dodecyl methacrylate, oxotridecyl methacrylate, "Lorol" methacrylate, tallow methacrylate, n-eicosyl methacrylate, etc. Tallow methacrylate is a mixture of about 33% by weight of $C_{16}$ and 67% by weight of $C_{18}$ straight-chain alkyl methylacrylates. Normally polymers of the invention of about 70 or higher relative syndiotacticity are preferred because of the higher viscosity index improving potency and also because they form smaller amounts of deposits in internal combustion engine use; however, the isotactic polymers are also useful. In forming the isotactic polymers it is prefered to either block the hydroxy group of the vinyloxyethanol as by using an excess of catalysts or by esterifying this group prior to polymerization unless the catalysts used is not reactive with the hydroxyl group. After the polymer is formed the hydroxyl group can be regenerated by hydrolysis or other suitable means. Normally Grignard catalysts such as phenyl magnesium-bromide are used at about 0° C. to form the isotactic polymers of the invention. Lithium alkyl catalysts can also be used to form the isotactic polymer. Block type polymers can also be desirable under some conditions. Methods of making isotactic and block polymers of methyl methacrylate, which methods are suitable for use in making the interpolymers of the present invention, are taught in the preprint of papers presented at the April 1959 Boston meeting of the American Chemical Society, Division of Paints, Plastics and Printing Ink Chemistry, pages 134–140, by W. E. Goode et al.

As has already been stated, good dispersant polymers can also be made by polymerizing vinyloxyethanol with other monomers such as acrylates, fumarates, maleates, vinyl esters and α-olefins. Also mixtures of these other monomers and including methacrylates can be used, if desired. These other monomers should be chosen to provide an oil-soluble polymer. For example, α-olefins or mixtures thereof having an average of at least about 8 carbon atoms, preferably 10 or higher should be used, with an upper limit of about 20 being preferred. Thus bearing in mind the above limitations an olefin or combination of olefins can be picked from the following illustrative list: ethylene, propylene, isobutene, pentene-1, 2-methylbutene-1, 3-methylbutene-1, hexene-1, heptene-1, octene-1, decene-1, dodecene-1, tridecene-1, heptadecene-1, octadecene-1, eicosene-1, etc. Obviously the short chain olefins must be used in mixture with long chain olefins to give oil-soluble polymers. In the case of the acrylates nothing would be accomplished by naming a large number of them since the alkyl acrylates corresponding to named alkyl methacrylates will be usable, and the same limitations apply as for the methacrylates. For the fumarates and maleates the average number of carbon atoms in the two alkyl groups must be sufficient to give oil-solubility, i.e., at least 6 and preferably 8 to about 20. Thus to meet these requirements single or mixtures of fumarates can be selected from the following illustrative list: dimethyl fumarate, dimethyl maleate, diethyl fumarate, ethyl methyl fumarate, diisopropyl maleate, di-t-butyl fumarate, di-n-butyl fumarate, diisobutyl fumarate, ethyl n-butyl maleate, di-n-hexyl fumarate, di-n-decyl maleate, methyl lauryl fumarate, etc. In the case of the vinyl esters the oil solubility must, of course, be supplied by the acid radical portion of the molecule, and this portion of the molecule should average at least 6 and preferably 8 to 20 carbon atoms per molecule. Thus vinyl esters or mixtures can be selected from the following illustrative list: vinyl acetate, vinyl propionate, vinyl n-butyrate, vinyl isobutyrate, vinyl n-valerate, vinyl trimethylacetate, vinyl caproate, vinyl n-heptylate, vinyl caprylate, vinyl 2-ethyl hexoate, vinyl pelargonate, vinyl palmitate, vinyl stearate, etc.

Depending on the particular use, it can be desirable for a functional fluid to have high viscosity index. An illustrative but non-limiting list of functional fluids which are improved in viscosity index and in dispersant characteristics by addition of polymers of the invention are the following: polyphenyls such as biphenyl, the terphenyls such as o-, m- and p-terphenyl and the alkylated biphenyl and terphenyls such as the mono or dialkyl, methyl, ethyl, n-propyl, isopropyl, n-butyl, isobutyl, t-butyl, etc.; partially chlorinated biphenyls known in the trade as "Aroclors" which contain from about 40 to 80% by weight of combined chlorine; poly(oxyphenylene) benzenes and particularly ethers of the formula

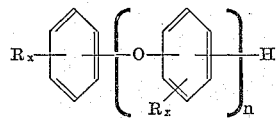

wherein $n$ is an integer from about 3 to about 8, R is an alkyl radical having below about 5 carbon atoms, i.e, methyl, ethyl, n-propyl, isopropyl, n-butyl, isobutyl, t-butyl or mixtures thereof, and $x$ is an integer from 0 to 4; diesters of dicarboxylic acids such as dioctyl sebacate and dioctyl adipate and esters such as pentaerythritol tetracaproate; phosphates such as trialkyl phosphates from tributyl to trilauryl such as tri(2-ethylhexyl) phosphate, dialkyl monoaryl phosphates wherein the alkyl groups are $C_4$–$C_{12}$ and the aryl groups are phenyl or cresyl, particularly dibutyl phenyl phosphate and di(2-ethylhexyl) phenyl phosphate, the monoalkyl diaryl phosphates wherein the alkyl groups are $C_4$–$C_{12}$ and the aryl groups are phenyl and/or crysyl, especially 2-ethylhexyl diphenyl phosphate and 6-methylheptyl diphenyl phosphate, the liquid triaryl phosphates, namely tricresyl phosphate, cresyl diphenyl phosphate and phenyl dicresyl phosphate; liquid polymeric silicones which are well known in the art; etc.

The invention will be more clearly understood from the following detailed description of specific examples thereof.

EXAMPLE 1

This example describes the preparation of a "Lorol" methacrylate polymer for comparison with polymers of the invention. This run was carried out in an analogous manner to Example 2 below and is summarized in Table 1 below. "Lorol" methacrylate is a mixture of 3%–$C_{10}$, 61%–$C_{12}$, 23%–$C_{14}$, 11%–$C_{16}$ and 2%–$C_{18}$ straight-chain alkyl methacrylates.

EXAMPLE 2

This example describes the preparation of a methacrylate-vinyloxyethanol polymer of the invention. A sample of 58 g. of "Lorol" methacrylate and 40 g. of benzene were weighed into a "Coke" bottle. The "Lorol" methacrylate had been purified by decolorization with charcoal, filtering to remove the charcoal and then passing through an alumina column. The benzene was thiophene free. Next 2 g. of vinyloxyethanol was added to the "Coke" bottle. The vinyloxyethanol was freshly distilled at 43° C. under water pump vacuum. Then 0.098 g. of azobisisobutyronitrile catalyst was added to the other ingredients. The bottle was flushed with nitrogen, caped and placed in a rotating air oven at 70° C. for 90 hours. At the end of the 90 hours 90 g. of Base Oil No. 1 was added to a tared flask. The characteristics of Base Oil No. 1 are described after Table 1 below. The reaction mixture was then transferred to this flask, the "Coke" bottle was washed with benzene and the washings transferred to the flask. The flask was heated under water pump vacuum to remove the benzene and heating was continued until the temperature of 150° C. was reached to distill out any unreacted monomer. The flask was then weighed to determine the amount of polymer present and enough Base Oil No. 1 was added to bring the concentration of the polymer to 30% by weight.

EXAMPLES 3–7

These examples of making polymers of the invention were carried out in an analogous manner to that described for Example 2 above except as indicated in Table 1 below which summarizes these runs.

EXAMPLE 8

This example describes the preparation of a "Lorol" methacrylate and methyl methacrylate copolymer for comparison with polymers of the invention. This experiment was carried out in an analogous manner to that described for Example 9 below and this example is summarized in Table 1 below.

EXAMPLE 9

The same polymerization procedure and conditions of polymerization were used in this example as were used in Example 2 above. The methyl methacrylate comonomer was pipetted into each bottle and had been previously purified by percolation through alumina. The charges of reactants to the "Coke" bottle were as follows: 53.4 g. of "Lorol" methacrylate, 6.6 g. of methyl methacrylate, 2 g. of vinyloxyethanol, 0.118 g. of azobisisobutyronitrile catalyst and 41.3 g. of benzene. A 30% concentrate of the polymer in Base Oil No. 1 was made in the same manner as the 30% concentrate of Example 2.

EXAMPLES 10–12

These examples were carried out in an analogous manner to that described in Example 9 above and are summarized in Table 1 below.

EXAMPLE 13

This example describes the preparation of a "Lorol" methacrylate-vinyloxyethanol polymer of the invention. The same procedure was used for preparing the polymer of this example as was used for preparing the polymer of Example 2. The materials charged to the "Coke" bottle were as follows: 54 g. of "Lorol" methacrylate, 6 g. of vinyloxyethanol, 0.111 g. of azobisisobutyronitrile and 40 g. of benzene. The treatment of the crude polymer, however, was different. At the end of the polymerization run, the reaction mixture was poured into methanol to precipitate the polymer. Then the polymer was dissolved in hot benzene and reprecipitated from methanol. The dissolving in benzene and precipitating from methanol was repeated twice more. The purified polymer was then dried at 40° C. in a vacuum oven overnight. Dry weight of the polymer was 51.6 g.

EXAMPLE 14

This example was carried out in an analogous manner to Example 13 including the purification of the polymer. This example is summarized in Table 1 below. Yield of purified and dried polymer was 57.4 g.

EXAMPLE 15

This example describes the preparation of a polymer of the invention having incorporated therein a small amount of dibutyl fumarate. This example was carried out in a similar manner to Example 2 except that the polymerization time was 65 hours rather than 90 hours. Reactants charged were as follows: 54 g. of "Lorol" methacrylate, 6 g. of vinyloxyethanol, 1.2 g. of dibutyl fumarate, 0.11 g. of azobisisobutyronitrile catalyst and 40 g. of benzene. At the end of the polymerization run, the reaction mixture was poured into methanol to precipitate the polymer. The polymer was then dissolved in benzene and reprecipitated from methanol for a series of three times for purification. The purified polymer was dried in a vacuum oven at 50° C. to yield 52.5 g. purified product.

EXAMPLE 16

This example was carried out in an analogous manner to Example 15 and is summarized in Table 1 below. Dry purified polymer weighed 48.6 g.

EXAMPLE 17

This example was also carried out in a manner analogous to Example 15. The catalyst, however, in this example was 0.191 g. of benzoyl peroxide rather than the azo catalyst of Example 15. This example is summarized in Table 1 below. Exactly the same amount of dibutyl fumarate was used in each of the Examples 15–17. Dried purified polymer weighed 47.2 g.

EXAMPLE 18

This example describes the preparation of a polymer of the invention having a small amount of dibutyl fumarate therein and methyl methacrylate as a comonomer. The procedure followed in this example was the same as in Example 15. The charge of reactants was as follows. 53.4 g. of "Lorol" methacrylate, 6.6 g. of methyl methacrylate, 4 g. of vinyloxyethanol, 1.28 g. of dibutyl fumarate, 0.127 g. of azobisisobutylronitrile catalyst and 42.7 g. of benzene. Dried purified polymer weighed 58.3 g.

EXAMPLE 19

This example was carried out in a manner analogous to Example 18 and is summarized in Table 1 below. A slightly larger amount of dibutyl fumarate was used than in Example 18, namely 1.36 g. Dried purified polymer weighed 59.5 g.

EXAMPLE 20

This example was carried out in a manner analogous to Example 18 except that like Example 19 a slightly larger amount of dibutyl fumarate was used namely 1.36 g. and the catalyst in this example was .261 g. of benzoyl peroxide rather than the azo catalyst of Example 18. Dried purified polymer weighed 59.8 g.

EXAMPLE 21

This example describes the making of a polymer of the invention in the presence of a small amount of an amine. This example was carried out in a manner similar to Example 2 except that the polymerization time was 64 hours. The charge of reactants was as follows: 48 g. of "Lorol" methacrylate, 12 g. of vinyloxyethanol, 0.129 g. of azobisisobutyronitrile catalyst, 0.08 ml. of triethylamine and 40 g. of benzene. The crude polymer was precipitated from methanol, dissolved in hot benzene and again precipitated from methanol, and yet a second time dissolved in benzene and precipitated from methanol. The purified polymer sample was partially dried by heating on a steam bath, then dried on a vacuum oven at 58° C. overnight. Yield of purified dried polymer was 47.6 g.

EXAMPLE 22

This example describes an experiment carried out in a similar manner with similar reactants as in Example 21 except that 0.06 ml. of pyridine was used as the amine rather than triethylamine. This example is summarized in Table 1 below. Yield of purified dried polymer was 47.4 g.

EXAMPLE 23

This example was carried out in a manner similar to Example 21, except that a terpolymer was made wherein a minor amount of methyl methacrylate was incorporated. Yield of purified product was 58.7 g. This run is summarized in Table 1 below.

EXAMPLE 24

This example was similar to Example 23 except that the amine like Example 22 was pyridine rather than triethylamine. Yield of purified dried product was 58.5 g. This run is summarized in Table 1 below.

EXAMPLE 25

This example describes the preparation of a highly syndiotactic polymer of the invention. To a reaction flask was charged 19 g. of lauryl methacrylate and 2.2 g. of vinyloxyethanol. The reaction flask was then flushed with nitrogen and the monomers cooled under nitrogen to 0° C. At this temperature 0.29 ml. of triethyl boron was added followed by the addition of 0.145 ml. of cumene hydroperoxide. The reaction mixture was stirred and allowed to react at 0° C. for 21 hours. At the end of the 21 hour polymerization period the reaction mixture was poured into methanol to precipitate the polymer. The precipitated polymer was then dissolved in hot benzene and reprecipitated from methanol. This dissolving in hot benzene and precipitating from methanol treatment was repeated two additional times. The purified polymer was then dried in a vacuum oven at 50° C. for 45 hours. The dry weight of the purified polymer was 8.0 g.

EXAMPLE 26

This example describes the preparation of another highly syndiotacti polymer of the invention. To the reaction vessel were added 38.1 g. of lauryl methacrylate, 5.0 g. of methyl methacrylate, 4.4 g. of vinyloxyethanol and 0.30 ml. of pyridine. The monomers and pyridine were cooled under nitrogen blanketing to 0° C. Then 0.55 ml. of triethyl boron was added to the reaction mixture followed by the addition of 0.23 ml. of cumene hydroperoxide. The polymerization time at temperatures of about 0° C. was 4 hours. At the end of the polymerization period, benzene was added to the reaction mixture to dissolve the polymer. A small portion of the polymer in benzene solution (less than 1 g. solution) was used for carbon black dispersency tests. The polymer gave excellent carbon black dispersion. The remainder of the benzene solution of the polymer was divided into two parts. To one part was added 59.8 g. of Base Oil No. 1. The benzene was then evaporated from this sample under vacuum and when the pot temperature reached 110° C. the heating was stopped. This sample contained 59.8 g. of Base Oil No. 1 and 23.1 g. of polymer. The second large portion of the benzene solution of the polymer was treated in the usual manner of precipitation from methanol dissolving in benzene and precipitation from methanol. The purified polymer was dried overnight in a vacuum oven at 60° C. yielding 22.3 g. of dried purified polymer.

EXAMPLE 27

This example describes the preparation of another highly syndiotactic polymer of the invention. To the reaction vessel were added 25.4 g. of oxo-tridecyl methacrylate, 18.1 g. of tallow methacrylate, 5.0 g. of methyl methacrylate, 10.0 g. of vinyloxyethanol, and 0.377 ml. of pyridine. The monomers and pyridine were cooled under nitrogen blanketing to 20° C. Then 0.688 ml. of triethyl boron was added to the reaction mixture followed by the addition of 0.292 ml. of cumene hydroperoxide. The polymerization time at a temperature of 20° C. was 6 hours. The first hour of polymerization was carried out in mass but after 1 hour the viscosity of the mass became so great that dilution was necessary. Dilution was carried out during the second hour of polymerization by adding 58.5 g. of white mineral oil (Base Oil No. 3) in seven 10 ml. portions at 10 minute intervals with stirring. No further oil was added after 2 hours and before the end of the 6 hour polymerization period. After 6 hours the reaction mixture was diluted with 25 ml. benzene and 78.0 g. of Base Oil No. 1 were added to reduce the solids concentration in total oil to 30.0%. Benzene was stripped under vacuum to a maximum of 150° C. to yield the final 30% concentrate. The weight percent of vinyloxyethanol in the polymer was found to be 8.64.

EXAMPLE 28

This example was carried out in an analogous manner to Example 27 except the step involving dilution with Base Oil No. 3 during the polymerization. Reactants, amounts, temperature, and time was identical to Example 27. In this case the 58.5 g. white mineral oil for dilution was added as follows: 10 ml. at 1 hour; 10 ml. at 1 hour, 10 minutes; 10 ml. at 1 hour, 20 minutes; 5 ml. at 1 hour 40 minutes; 5 ml. at 2 hours; 2.5 ml. at 2 hours 30 minutes; 2.5 ml. at 3 hours; 2.5 ml. at 4 hours; 2.5 ml. at 5 hours and 20 ml. at 6 hours. The product was finished to a 30% solids in oil concentrate in analogous fashion to Example 27. Vinyloxyethanol in the polymer was found to be 8.6%.

EXAMPLE 29

To the reaction vessel were added 24 g. of n-lauryl methacrylate, 18 g. of tallow methacrylate, 6.0 g. of methyl methacrylate, 12.0 g. of vinyloxyethanol, and 0.139 ml. of pyridine. The monomers and pyridine were cooled under nitrogen blanketing to 20° C. Then 0.253 ml. of triethyl boron was added followed by 0.358 ml. of cumene hydroperoxide. The polymerization time at 20° C. was 6 hours. As in Example 27 the polymerization was started in mass and in this case was continued so for 2 hours. Dilution with 60 g. of Base Oil No. 3 was carried out according to the following:

5 ml. at 2 hours 15 minutes; 5 ml. at 2 hours 25 minutes;
5 ml. at 2 hours 30 minutes; 5 ml. at 2 hours 35 minutes;
5 ml. at 2 hours 45 minutes; 5 ml. at 3 hours;
5 ml. at 3 hours 15 minutes; 5 ml. at 3 hours 30 minutes;
5 ml. at 4 hours 30 minutes; 5 ml. at 5 hours;
5 ml. at 5 hours 45 minutes; and 15 ml. at 6 hours.

After 6 hours the reaction mixture was diluted with 25 ml. benzene and 80 g. Base Oil No. 1 to reduce the solids concentration in total oil to 30%. Benzene was stripped under vacuum to a maximum of 150° C. to yield the final 30% concentrate.

In Table 1 below all the experimental examples 1 through 26 are summarized with the specific viscosity and viscosity improving efficiency characteristics of each polymer being given. The specific viscosities were run on oil samples made by diluting a 30% concentrate of the polymer in Base Oil No. 1 to 3% using Base Oil No. 2.

Efficiency=
$$\frac{\text{Specific viscosity at } 210° \text{ F.}}{\text{Specific viscosity at } 100° \text{ F.}}$$

Table 1

| Ex. No. | Polymer temp., °C. | Monomers,[1] grams | | | | | | Molar ratio | Wt. percent VOE charged | Wt. percent VOE found | Specific viscosity at— | | Efficiency |
|---|---|---|---|---|---|---|---|---|---|---|---|---|---|
| | | LoM | TriM | LM | TaM | MM | VOE | | | | 100° F. | 210° F. | |
| 1 | 70 | 60 | | | | | 0 | 100/0 | 0.0 | | 0.882 | 1.049 | 1.19 |
| 2 | 70 | 58 | | | | | 2 | 90.5/9.5 | 3.3 | | 0.853 | 1.034 | 1.21 |
| 3 | 70 | 56 | | | | | 4 | 82.3/17.7 | 6.7 | | 0.852 | 1.028 | 1.21 |
| 4 | 70 | 54 | | | | | 6 | 75/25 | 10 | | 0.991 | 1.235 | 1.25 |
| 5 | 70 | 52 | | | | | 8 | 68/32 | 13.3 | | 0.828 | 1.031 | 1.25 |
| 6 | 70 | 50 | | | | | 10 | 62/38 | 16.7 | | 0.866 | 1.126 | 1.30 |
| 7 | 70 | 48 | | | | | 12 | 57/43 | 20.0 | | 0.686 | 0.899 | 1.31 |
| 8 | 70 | 53.4 | | | | 6.6 | 0 | 75/25/0 | 0.0 | | 0.506 | 0.762 | 1.51 |
| 9 | 70 | 53.4 | | | | 6.6 | 2 | 69/23/8 | 3.2 | | 0.470 | 0.720 | 1.53 |
| 10 | 70 | 53.4 | | | | 6.6 | 4 | 64/21/15 | 6.2 | | 0.466 | 0.740 | 1.59 |
| 11 | 70 | 53.4 | | | | 6.6 | 6 | 60/20/20 | 9.1 | | 0.574 | 0.899 | 1.57 |
| 12 | 70 | 53.4 | | | | 6.6 | 8 | 56/18.5/25.5 | 11.7 | | 0.560 | 0.939 | 1.68 |
| 13 | 70 | 54 | | | | | 6 | 75/25 | 10.0 | 5.4 | 0.833 | 1.085 | 1.23 |
| 14 | 70 | 53.4 | | | | 6.6 | 4 | 64/21/15 | 6.2 | 3.5 | 0.565 | 0.864 | 1.53 |
| 15 | 70 | 54 | | | | | 6 | 75/25 | 10.0 | 5.2 | 0.809 | 1.002 | 1.24 |
| 16 | 70 | 48 | | | | | 12 | 57/43 | 20.0 | 8.4 | 0.653 | 0.862 | 1.32 |
| 17 | 70 | 48 | | | | | 12 | 57/43 | 20.0 | 8.1 | 0.768 | 1.028 | 1.34 |
| 18 | 70 | 53.4 | | | | 6.6 | 4 | 64/21/15 | 6.2 | 3.7 | 0.628 | 0.954 | 1.52 |
| 19 | 70 | 53.4 | | | | 6.6 | 8 | 56/18.5/25.5 | 11.7 | 5.2 | 0.456 | 0.724 | 1.60 |
| 20 | 70 | 53.4 | | | | 6.6 | 8 | 56/18.5/25.5 | 11.7 | 5.2 | 0.556 | 0.915 | 1.65 |
| 21 | 70 | 48 | | | | | 12 | 57/43 | 20.0 | 9.0 | 0.729 | 0.962 | 1.32 |
| 22 | 70 | 48 | | | | | 12 | 57/43 | 20.0 | 8.4 | 0.809 | 1.078 | 1.33 |
| 23 | 70 | 53.4 | | | | 6.6 | 8 | 56/18.5/25.5 | 11.7 | 6.5 | 0.464 | 0.781 | 1.68 |
| 24 | 70 | 53.4 | | | | 6.6 | 8 | 56/18.5/25.5 | 11.7 | 3.6 | 0.515 | 0.896 | 1.74 |
| 25 | 0 | | | 19 | | | 2.2 | 75/25 | 10.5 | 1.8 | 1.014 | 1.274 | 1.26 |
| 26 | 0 | | | 38.1 | | 5.0 | 4.4 | 60/20/20 | 9.3 | 3.6 | 0.566 | 1.133 | 2.00 |
| 27 | 20 | | 25.4 | | 18.1 | 5 | 10 | 30.3/17.5/15.9/36.3 | 17.1 | 8.6 | [2]0.329 | [2]0.507 | 1.54 |
| 28 | 20 | | 25.4 | | 18.1 | 5 | 10 | 30.3/17.5/15.9/36.3 | 17.1 | 8.6 | [2]0.352 | [2]0.540 | 1.53 |
| 29 | 20 | | | 24 | 18 | 6 | 12 | 27.4/15.8/17.4/39.4 | 20 | 5.2 | [2]0.564 | [2]0.954 | 1.69 |

[1] LoM is a mixture of 3%-$C_{10}$, 61%-$C_{12}$, 23%-$C_{14}$, 11%-$C_{16}$ and 2%-$C_{18}$ straight-chain alkyl methacrylates.
TriM is oxo-tridecyl methacrylate.
TaM is tallow methacrylate.
MM is methyl methacrylate.
VOE is vinyloxyethanol.
LM is lauryl methacrylate.

[2] Specific viscosities on 3% pure polymer made by diluting 30% concentrate of polymer in Base Oils Nos. 1 and 3 with Base Oil No. 2 to 3% polymer concentration in the base oils.

The characteristics of the base oils to which the polymer was added for making the specific viscosity and efficiency measurements are as follows:

BASE OIL NO. 1

This is a solvent refined Mid-Continent petroleum oil having the following properties:

Viscosity at 210° F., centistokes _____ 3.94
Viscosity at 100° F., centistokes _____ 21.58
Viscosity index _____ 75.3
Specific gravity 25°/25° C. _____ 0.886
Flash point, Cleveland open cup,° F. _____ 375

BASE OIL NO. 2

This oil is a solvent refined Mid-Continent petroleum oil having the following properties:

Viscosity at 210° F., centistokes _____ 10.39
Viscosity at 100° F., centistokes _____ 91.73
Viscosity index _____ 103.4
Flash point, Cleveland open cup,° F. _____ 450

BASE OIL NO. 3

Standard Oil Co. White Oil, U.S.P. No. _____ 210
Viscosity at 210° F., centistokes _____ 6.26
Viscosity at 100° F., centistokes _____ 45.21
Viscosity index _____ 92.8

Table 2 below sets forth data of the testing of the additives of the invention in a carbon black dispersion test. This method tests the ability of the additives to hold carbon black dispersed in kerosene. The testing is carried out both in the presence and in the absence of water since some additives tend to leach out and become ineffective in the presence of water. A carbon black concentrate is made up to 15% by weight carbon in a highly refined mineral white oil. One gram of this carbon oil paste is added to a 25 x 150 mm. culture test tube with a plastic closed top, and to the flask are then added 30 g. of kerosene. Thus the concentration of the carbon based on the kerosene is 0.5% by weight. Then 0.5% by weight based on the active ingredient present of the various dispersants to be tested are weighed into separate test tubes, containing the kerosene and carbon black. The test tube is sealed and the ingredient dispersed by 15 minutes of shaking by hand. To the test wherein water is present, 1 volume percent of water (about 0.4 ml.) is added to the other ingredient in the test tube. The test tubes after being thoroughly agitated are placed in a rack and observations of the degree of settling are made periodically. The results in Table 2 are reported in the time for complete settling, the time when partial settling was observed, or the number of days that the testing was run before it was terminated and when no settling was observed. The tests were conducted at room temperature.

Table 2
CARBON BLACK DISPERSION

| Additive of example | Time for carbon black to settle—no water present | Time for carbon black to settle—water present |
|---|---|---|
| None | 5 minutes | 5 minutes. |
| 1 | 5 minutes | 5 minutes. |
| 2 | | 3 days. |
| 3 | | 4 weeks. |
| 4 | | PS 4 weeks. |
| 5 | | PS 4 weeks. |
| 6 | | NS 4 weeks. |
| 7 | | NS 4 weeks. |
| 8 | | 5 minutes. |
| 9 | | 4 weeks. |
| 10 | | NS 4 weeks. |
| 11 | | NS 4 weeks. |
| 12 | | NS 4 weeks. |
| 13 | Not run | |
| 14 | Not run | |
| 15 | | NS 4 days. |
| 16 | 4 hours | NS 4 days. |
| 17 | | NS 4 days. |
| 18 | | 24 hours. |
| 19 | | 4 days. |
| 20 | | 24 hours. |
| 21 | 24 hours | |
| 22 | 24 hours | |
| 23 | 24 hours | |
| 24 | 24 hours | |
| 25 | Not run | |
| 26 | 23 days | 24 hours. |
| 27 | 24 hours | 24 hours. |
| 28 | 24 hours | 24 hours. |
| 29 | 13 days | |

NS means not settled.
PS means partially settled.

EXAMPLE 30

This example describes the advantageous viscosity boost with resultant increased viscosity increase potency that occurs when a low temperature detergent of the invention is compounded in oil with a heavy duty barium-containing detergent. The heavy duty barium detergent used in this example was "Santolube 333." Base Oil No. 2 was the oil in which the blend of the polymer of Example 26 and the heavy duty detergent were mixed. Other metal containing heavy duty detergents, especially those containing barium or calcium react similarly, e.g.

Further compounded oils were prepared using Base Oil No. 2 and the additives of the invention from Examples 27, 28 and 29 with "Santolube 333" which further illustrate the increased visocity potency and viscosity index of these materials in the presence of a heavy duty barium containing detergent. The concentrations of the additives from Examples 27, 28 and 29 in each case was 3% and of the "Santolue 333", 2%. Oil viscosities at 100° F. and 210° F. were obtained after 16, 64, 88, and 160 hours storage at 60° C. These results are summarized in Table 4 below.

*Table 3*

| Legend | Viscosity, at 100° F. | Centistokes at 210° F. | Specific viscosity at— | | Efficiency | V.I. | Percent specific viscosity increase at— | | Time, hours |
|---|---|---|---|---|---|---|---|---|---|
| | | | 100° F. | 210° F. | | | 100° F. | 210° F. | |
| Compounded Oil No. 1 [1] | 143.59 | 22.19 | 0.566 | 1.133 | 2.00 | 139.6 | | | |
| Compounded Oil No. 2 [2] | 164.49 | 26.70 | 0.794 | 1.568 | 1.98 | 140.5 | 40.3 | 38.4 | 0 |
| | 164.49 | 27.11 | 0.794 | 1.607 | 2.02 | 140.9 | 40.3 | 41.8 | [4] 10 |
| | 165.52 | 27.44 | 0.805 | 1.638 | 2.03 | 140.9 | 42.2 | 44.6 | 0.5 |
| | 167.22 | 27.86 | 0.824 | 1.680 | 2.04 | 141.0 | 45.6 | 48.3 | 1.0 |
| | 168.70 | 28.07 | 0.840 | 1.699 | 2.03 | 140.9 | 48.4 | 50.0 | 1.5 |
| | 169.49 | 28.27 | 0.849 | 1.718 | 2.02 | 140.9 | 50.0 | 51.6 | 2.0 |
| | 170.51 | 28.52 | 0.860 | 1.743 | 2.03 | 140.9 | 51.9 | 53.8 | 2.5 |
| | 178.24 | 30.77 | 0.944 | 1.959 | 2.08 | 141.0 | 66.8 | 72.9 | 11 |
| Compounded Oil No. 3 [3] | 90.05 | 10.26 | | | | | | | 0 |

[1] This oil was made by diluting a 30% concentrate of the additive of Example 26 in Base Oil No. 1 with Base Oil No. 2 to a concentration of 3%.
[2] This oil is Compounded Oil No. 1 having 1.28% barium detergent incorporated therein by 15 minutes of cold mixing on a wheel.
[3] This oil is Base Oil No. 2 having 1.28% barium detergent incorporated therein with no VOE polymer.
[4] Minutes.

*Table 4*

| VOE polymer* example No. | Santolube* 333, percent | Hours at 60° C. | Viscosity, 100° F. | Centistokes 210° F. | Specific viscosity at | | Percent specific viscosity increase at— | | V.I. |
|---|---|---|---|---|---|---|---|---|---|
| | | | | | 100° F. | 210° F. | 100° F. | 210° F. | |
| Base Oil No. 2 | | | 91.73 | 10.39 | | | | | 103.4 |
| | 2 | 0 | 89.52 | 10.20 | | | | | 103.2 |
| | 2 | 16 | 89.13 | 10.15 | | | | | 103.3 |
| | 2 | 88 | 89.13 | 10.18 | | | | | 102.8 |
| 27-3% | | 0 | 122.16 | 15.61 | 0.334 | 0.505 | | | 127.4 |
| 27-3% | | 16 | 121.70 | 15.63 | 0.329 | 0.507 | | | 127.7 |
| 27-3% | | 88 | 120.77 | 15.51 | 0.319 | 0.495 | | | 127.6 |
| 27-3% | 2 | 16 | 130.30 | 16.84 | 0.418 | 0.619 | 25.1 | 22.6 | 129.3 |
| 27-3% | 2 | 88 | 133.71 | 17.26 | 0.455 | 0.660 | 36.2 | 30.7 | 129.6 |
| 27-3% | 2 | 160 | 135.26 | 17.39 | 0.477 | 0.677 | 42.8 | 34.1 | 129.5 |
| 28-3% | | 0 | 124.48 | 16.05 | 0.359 | 0.547 | | | 128.4 |
| 28-3% | | 16 | 123.78 | 15.97 | 0.352 | 0.540 | | | 128.4 |
| 28-3% | | 64 | 123.48 | 15.95 | 0.344 | 0.534 | | | 128.4 |
| 28-3% | 2 | 16 | 132.57 | 17.34 | 0.443 | 0.667 | 23.4 | 21.9 | 130.5 |
| 28-3% | 2 | 64 | 135.72 | 17.68 | 0.482 | 0.705 | 34.3 | 28.9 | 130.5 |
| 28-3% | 2 | 160 | 138.96 | 17.98 | 0.518 | 0.733 | 44.3 | 34.0 | 130.3 |
| 29-3% | | 16 | 143.70 | 20.32 | 0.564 | 0.954 | | | 135.8 |
| 29-3% | 2 | 16 | 161.89 | 23.51 | 0.767 | 1.267 | 36.0 | 32.8 | 137.2 |
| 29-3% | 2 | 88 | 170.26 | 24.73 | 0.859 | 1.384 | 52.3 | 45.1 | 137.2 |
| 29-3% | 2 | 160 | 174.55 | 25.19 | 0.906 | 1.429 | 60.6 | 49.8 | 136.9 |

* All additives blended in Base Oil No. 2.

"Amoco 121" which is a hydrolyzed polyisobutylene-$P_2S_5$ reaction product containing barium behave similarly to Santolube 333" with additives of the invention. To Base Oil No. 2 was added a sufficient amount of a 30% concentrate of the additive of Example 26 in Base Oil No. 1 to give a 3% concentration of the additive in the test oil. The viscosity characteristics of this 3% additive in the test oil were measured and are reported in the table below. Then a quantity of "Santolube 333", the barium detergent, sufficient to give 1.28% of this barium detergent in the final oil was added to the test oil containing 3% of the additive of Example 26. These mixed additives were blended cold on a mixing wheel for 15 minutes. Again viscosity measurements were made at 100° F. and 210° F. The oil was held at 100° F. and 210° F. and viscosities were again measured at 10 minutes, 30 minutes and at longer lengths of time up to 11 hours. The data from these experiments are summarized in Table 3 below along with calculated specific viscosity, efficiency and viscosity index data.

Although the invention has been described in terms of specified embodiments which are set forth in considerable detail, it should be understood that this is by way of illustration only and that the invention is not necessarily limited thereto, since alternative embodiments and operating techniques will become apparent to those skilled in the art in view of the disclosure. For example, vinylthioethanol ($CH_2{=}CHSCH_2CH_2OH$), vinyloxypropanol, vinyloxyethoxyethanol and the like are to a degree the equivalent of vinyloxyethanol in the polymers of the invention. Vinyloxypropanol can be made in a manner analogous to vinyloxyethanol by reaction of acetylene with propylene oxide. Compounds such as vinyloxyethoxyethanol are made by reacting vinyloxyethanol with ethylene oxide. Accordingly, modifications are contemplated which can be made without departing from the spirit of the described invention.

What is claimed is:

1. A mineral oil composition having dispersant properties comprising a major amount of mineral oil and a minor amount of an oil-soluble polymer, said polymer comprising a major amount of an alkyl methacrylate having not less than 6 and not more than about 20 carbon atoms in the alkyl group and a minor amount of vinyloxyethanol in the range of 2 to 20% by weight.

2. Mineral oil compositions having dispersant properties, comprising a major amount of mineral oil and a minor amount of an oil-soluble polymer, said polymer consisting essentially of a minor amount of vinyloxyethanol in the range of 2 to 20% by weight and a major amount of a mixture of $C_8$–$C_{20}$ alkyl methacrylate and an amount of $C_1$–$C_4$ alkyl methacrylate insufficient to form an oil-insoluble polymer.

3. Mineral oil compositions having dispersant properties comprising a major amount of mineral oil and a minor amount of an oil-soluble polymer, said polymer consisting essentially of a major amount of a mixture of straight-chain $C_{10}$–$C_{18}$ alkyl methacrylates and a minor amount of vinyloxyethanol in the range of 2 to 20% by weight.

4. Mineral oil compositions having dispersant properties comprising a major amount of mineral oil and a minor amount of an oil-soluble polymer, said polymer consisting essentially of a major amount of a mixture of $C_{10}$–$C_{18}$ straight-chain alkyl methacrylates, a minor amount of methyl methacrylate and a minor amount of vinyloxyethanol, the vinyloxyethanol being present in the range of 2 to 20% by weight.

5. A mineral oil composition having dispersant properties comprising a major amount of mineral oil and a minor amount of an oil-soluble polymer, said polymer consisting essentially of a major amount of lauryl methacrylate and a minor amount of vinyloxyethanol, the vinyloxyethanol being present in the range of 2 to 20% by weight.

6. A mineral oil composition having dispersant properties comprising a major amount of mineral oil and a minor amount of an oil-soluble polymer, said polymer consisting essentially of a major amount of lauryl methacrylate, a minor amount of methyl methacrylate and a minor amount of vinyloxyethanol, the vinyloxyethanol being present in the range of 2 to 20% by weight.

7. A mineral oil composition having properties comprising a major amount of mineral oil and a minor amount of an oil-soluble polymer, said polymer consisting essentially of a major amount of a mixture of tallow methacrylate and oxotridecyl methacrylate and a minor amount of vinyloxyethanol, the vinyloxyethanol being present in the range of 2 to 20% by weight.

8. Mineral oil compositions having dispersant properties, comprising a major amount of mineral oil and a minor amount of an oil-soluble polymer, said polymer comprising a minor amount of vinyloxyethanol within the range of 2 to 20% by weight and a major amount of a mixture of $C_8$–$C_{20}$ alkyl methacrylate and an amount of $C_1$–$C_4$ alkyl methacrylate insufficient to form an oil-insoluble polymer.

9. A mineral oil composition having dispersant properties comprising a major amount of mineral oil and a minor amount of an oil-soluble polymer, said polymer consisting essentially of a major amount of an alkyl methacrylate having not less than 6 and not more than about 20 carbon atoms in the alkyl group and a minor amount of vinyloxyethanol in the range of 2 to 20% by weight.

References Cited by the Examiner

UNITED STATES PATENTS

| | | | |
|---|---|---|---|
| 2,691,646 | 10/54 | Young | 252—56 X |
| 2,704,277 | 3/55 | Giammaria | 252—56 |
| 2,710,282 | 6/55 | Linsk | 252—56 |
| 3,069,381 | 12/62 | Noziaki | 252—56 X |
| 3,076,791 | 2/63 | Hollyday | 252—56 X |

DANIEL E. WYMAN, *Primary Examiner.*